(12) United States Patent
Wang et al.

(10) Patent No.: US 12,498,796 B1
(45) Date of Patent: Dec. 16, 2025

(54) BACK-DRIVE OF MOTOR BASED ON POSITION DATA

(71) Applicant: Amazon Technologies, Inc., Seattle, WA (US)

(72) Inventors: Hua Wang, Austin, TX (US); Yi Li, Austin, TX (US); Abhay Gupta, Santa Clara, CA (US); Ehsan Omidi, Fremont, CA (US); Shichang Liu, San Jose, CA (US); Kevin Zhang, Austin, TX (US); Sanket Parikh, Leander, TX (US); Anchit Rastogi, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 81 days.

(21) Appl. No.: 18/087,530

(22) Filed: Dec. 22, 2022

Related U.S. Application Data

(63) Continuation of application No. 17/028,385, filed on Sep. 22, 2020, now Pat. No. 11,573,647.

(51) Int. Cl.
| | |
|---|---|
| *G06F 3/03* | (2006.01) |
| *G06F 3/01* | (2006.01) |
| *H02P 3/06* | (2006.01) |
| *H02P 6/28* | (2016.01) |
| *H02P 7/025* | (2016.01) |
| *H02P 7/06* | (2006.01) |
| *H02P 7/28* | (2016.01) |

(52) U.S. Cl.
CPC ............ *G06F 3/0304* (2013.01); *G06F 3/011* (2013.01); *G06F 3/017* (2013.01); *H02P 3/06* (2013.01); *H02P 6/28* (2016.02); *H02P 7/025* (2016.02); *H02P 7/06* (2013.01); *H02P 7/2805* (2013.01)

(58) Field of Classification Search
CPC ........ G06F 3/0304; G06F 3/011; G06F 3/017; H02P 3/06; H02P 6/28; H02P 7/025; H02P 7/06; H02P 7/2805; H02P 3/08
See application file for complete search history.

(56) References Cited

U.S. PATENT DOCUMENTS

| | | | | |
|---|---|---|---|---|
| 10,871,627 | B1* | 12/2020 | Fang ................. | G02B 27/0093 |
| 2011/0031923 | A1* | 2/2011 | Kanoyadani ........... | G05B 19/40 |
| | | | | 318/561 |
| 2015/0298308 | A1* | 10/2015 | Kato ....................... | B25C 1/06 |
| | | | | 318/484 |
| 2019/0011475 | A1* | 1/2019 | Wu ........................ | H02P 7/325 |

OTHER PUBLICATIONS

U.S. Appl. No. 17/028,385, "Notice of Allowance," mailed Sep. 29, 2022, 10 pages.

* cited by examiner

*Primary Examiner* — Matthew A Eason
*Assistant Examiner* — Chayce R Bibbee
(74) *Attorney, Agent, or Firm* — Kilpatrick Townsend & Stockton LLP

(57) ABSTRACT

Techniques for controlling operations of a motor based on position errors are described. In an example, a user device sends an amount of electrical current to the motor to cause the motor to move. The user device also determines the motor is in position for a time interval despite the amount of electrical current. Based at least one the time interval and the amount of electrical current, the user device determines a position difference associated with a target position and a measured position of the motor during the time interval, and reduces the amount of electrical current based at least in part on the time interval.

20 Claims, 12 Drawing Sheets

BACK-DRIVE OF MOTOR BASED ON POSITION DATA

CROSS-REFERENCE TO RELATED APPLICATION

This application claims priority to and is a continuation of U.S. patent application Ser. No. 17/028,385, filed Sep. 22, 2020, and entitled "BACK-DRIVE OF MOTOR BASED ON POSITION DATA," the content of which is hereby incorporated by reference in its entirety for all purposes.

BACKGROUND

As voice recognition technology improves, systems that employ such technology continue to proliferate. Some systems employ what is referred to as near-field voice recognition where a user speaks into a microphone located on a hand held device, such as a remote control or mobile device. Other systems employ far-field voice recognition where a user can speak to a device while the user is within the general vicinity of the device, e.g., within the same room, but not necessarily in close proximity to or even facing the device. Both far-field devices and near-field devices can support audio and video functionalities.

BRIEF DESCRIPTION OF THE DRAWINGS

Various embodiments in accordance with the present disclosure will be described with reference to the drawings, in which.

DETAILED DESCRIPTION

Figure 1:
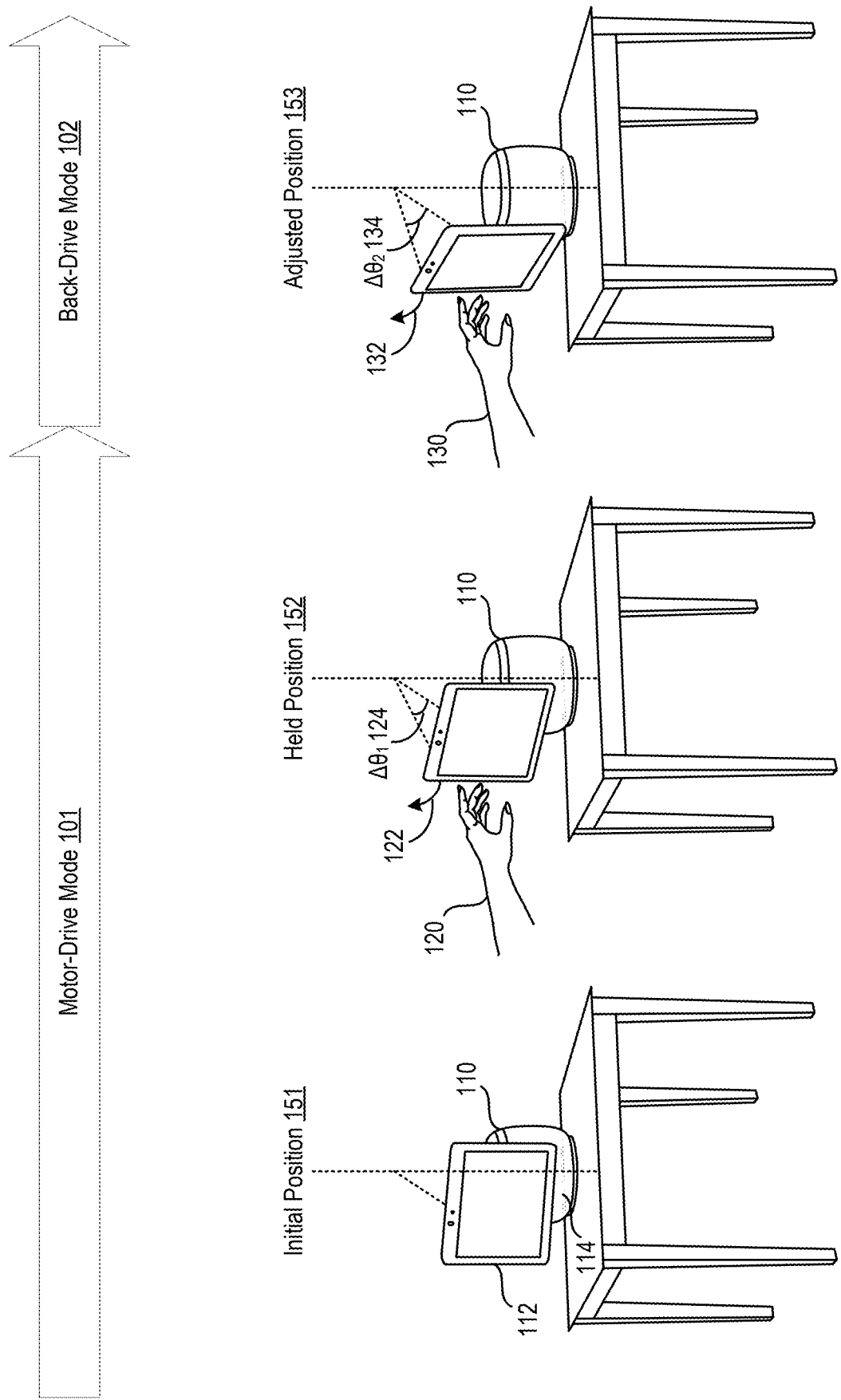
FIG. 1 illustrates an example of motions of a user device in a motor-drive mode and a back-drive mode, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, controlling operations of a motor based on position differences. In an example, a user device includes a load and a motor system that contains a motor and a motor controller. The motor is mechanically coupled with the load and supports motion operations in a motor-drive mode and a back-drive mode. In the motor-drive mode, the motor controller adjustably sends an amount of electrical current to the motor (e.g. controls the flow of the electrical current to the motor) such that the motor can rotate its rotor between different positions, thereby moving the load. In the back-drive mode, the motor controller may reduce the amount of the electrical current (e.g., stop the flow of the electrical current to the motor). Instead, an external force applied to the load can move the load, thereby rotating the motor's rotor. While in the motor-drive mode, an external force may be applied to the load. For a time interval, the motor controller increases the amount of the electrical current and determines that the motor is in position for the time interval despite the amount of electrical current. The motor controller may determine whether the motor is to operate next in the back-drive mode such that the external force can move the load or to remain in the motor-drive mode such that the load's position is held. This determination can be based on multiple conditions including, for instance, whether a velocity of the motor is to be set to zero, whether the amount of the electrical current is larger than a threshold value, and whether a position error of the motor has increased over time. If so (e.g., velocity to be set to zero, amount exceeding threshold, and position error increasing), the motor controller may stop or otherwise reduce the flow of the electrical current such that the back-drive mode is enabled. The motor continues to operate in the motor-drive mode.

To illustrate, consider an example of a voice-controller device (VCD). The VCD includes a display and a cylindrical body and is located in a room. The cylindrical body contains a motor system. The display integrates a camera to support video conferencing. A motor of the motor system is mechanically coupled with the display via at least a circular ring attached to the cylindrical body and the display, such that the display can be rotated. During a video conference, the display shows a video of a remote attendee located in a remote room. Based on video data from the camera, a computer vision algorithm executed by a processor of the VCD or another process can detect a local attendee in the room. A motor controller of the motor system may receive a command to rotate the motor to a target position associated with the local attendee, such that video data transmitted from the VCD may be centered around the local attendee. In response, the motor controller rotates the motor in the applicable direction. After the display is rotated to the target position, an external force is applied to the display to re-center the video around a different object (e.g., the local attendee may attempt to change the field of view of the camera). For a short period of time, such as less than one second, the motor controller controls the flow of an electrical current to the motor, such that a resistive force is generated and the motor's position is held during the short time period. The motor controller also determines that there is no command from the processor for a rotational movement and, thus, a command velocity of the motor is zero. Upon determining that the amount of the electrical current exceeds a threshold value (e.g., five-hundred milliamps), the motor controller determines that the position error of motor has also increased. The position error is the difference between the target position and a measured position of the motor. Given that the command velocity is zero, the amount of the electrical current is larger than the threshold value, and the position error has increased, the motor controller enables the back-drive mode by stopping the flow of the electrical current. Accordingly, the resistive force is withdrawn and the external force can rotate the display and back-drive the motor.

Embodiments of the present disclosure provide several advantages over conventional motor systems. For instance, the embodiments reduce the rate of false compliance by at least tracking how a position error of a motor changes over time. A motor system can distinguish between an obstacle (e.g., resulting in false compliance) and an external force applied to the load to move it differently (e.g., resulting in correct compliance). In the former situation, the position error does not change over time. In the latter case, the position error can change over time. The motor system switches to the back-drive mode if the position error changes, thereby avoiding false compliance and supporting correct compliance.

In the interest of clarity, embodiments of the present disclosure are described in connection with a user device that includes a display and a cylindrical body containing a motor system, where the display can be rotated partially or fully around the cylindrical body. However, the embodiments are not limited as such and similarly apply to any type of load, body, and/or motion. For instance, the load can be a speaker, a microphone, a camera, a second display, or any other object that can be mechanically coupled with a motor. Similarly, the body can have any shape. The motion of the load can depend on the type of mechanical coupling and can include, in addition or alternative to rotation motion, a lateral motion, or a motion along multiple axes.

In addition, the embodiments are described in connection with a motor-drive mode and a back-drive mode. However, the embodiments are not limited as such and similarly apply to a motor system that can support one or more other operational modes, in addition to the motor-drive mode and back-drive mode.

FIG. 1 illustrates an example of motions of a user device 110 in a motor-drive mode 101 and a back-drive mode 102, according to embodiments of the present disclosure. The user device 110 may include a display 112 that can be rotated around a cylindrical body 114 of the user device 110. Initially, the user device 110 operates in a motor-drive mode 101, where the rotation of the display 112 is controlled, at least in part, by a flow of electrical current to a motor of the user device 110. Based on tracking conditions related to an external force 120 applied to the display 112 (shown as a force being applied by a user arm), the user device 110 may switch to operating in the back-drive mode 102. While in the back-drive mode 102, an external force 130 applied to the display 112 (also shown as a force being applied by the user arm) can rotate the display 112.

In the illustrative example of FIG. 1, the user device 110 is initially not rotating the display 112, thereby the display 112 is resting at an initial position 151, which corresponds to an initial position of the motor (e.g., a position of the motor's rotor). Since a rotational motion is described herein, a position can be defined in a spherical coordinate system as a polar angle θ. However, other coordinate systems and expressions of a position can be used depending on the type of the motion. The initial position 151 (e.g., $\theta_0$) can be used as the start position of the motor for any subsequent rotational movement in the motor-drive mode 101.

Next, the external force 120 is applied to the display 112 while the user device 110 is the motor-drive mode 101. For instance, a user may attempt to grab and rotate or push the display 112 along a rotational direction 122. Because the motor-drive mode 101 is in effect, the user device 110 may initially resist the rotational motion by attempting to hold the display 112 as close as possible to the initial position 151 (illustrated as a held position 152). To do so, the flow of electrical current to the motor is controlled, where the amount of electrical current is typically increased to generate a resistive force in the opposite rotational direction.

The user device 110 can continuously (e.g., at periodic time intervals, such as at one millisecond intervals) track multiple conditions related to the application of the external force 120. For instance, the conditions can relate to velocity (or, equivalently, other force condition such as acceleration), electrical current (or, equivalently, other electrical condition such as electrical voltage or electrical power), or a position error. Depending on this tracking (e.g., when the conditions are met), the user device 110 may stop the flow of the electrical current to the motor, thereby withdrawing the resistive force and switching to the back-drive mode 102.

While in the back-drive mode 102, additional or another external force 130 is applied to the display 112. In particular, the display 112 can be rotated in a direction 132 from the held position 152 to an adjusted position 153 (the difference between the held position 152 and the adjusted position 153 is illustrated as a position difference ($\Delta\theta_2$) 134). The user device 110 may use some dampening force to avoid a quick rotational motion of the display 112, where the dampening can be accomplished via hardware and/or via a flow of a small amount of electrical current to the motor.

Referring to the example conditions, the velocity can be a command velocity ($V_{cmd}$). A command velocity refers to a velocity at which the motor is to be rotated given an output of a processor executing an application. For instance, the application may request a rotational motion of the display 112. If so, the processor may output data that represents a command to rotate the motor to a target position $\theta_T$ (also referred to as a command position $\theta_{cmd}$). The application can be implemented to detect a wakeword, to support text, audio, and/or video communications, audio detection, speech processing, sound processing, computer vision, and/or other types of functionalities that may necessitate a control of movement of a load by a motor system. For instance, the application can support sound control, where upon a determination that a detected sound indicates a glass break, a camera mechanically coupled to the motor system is motioned to the direction from which the sound originated.

To illustrate, the application can support wakeword detection. Upon the user device 110 receiving speech input that includes a wakeword, the application detects the wakeword and a direction from which the speech input was received. If the direction does not correspond to the initial position 151, the processor can output a command to set a target position of the motor to correspond to the direction. In another illustration, the application can support audio processing. During an audio communication session (e.g., an ongoing audio call), speech input is similarly received by the user device 110 and the application detects its direction. Here also if the direction is different from the initial position 151, the processor can output a command to set the target position. In another illustration, the application can support computer vision. During a video communication session (e.g., an ongoing video call), the application can process video data captured by a camera of the user device 110 to detect a direction at which a user is located. If the direction is different from the initial position 151, the processor can output a command to set the target position to correspond to the direction. In all three illustrations, if the target position does not correspond to the initial position 151, the command can result in rotation of the motor and, thus, a non-zero command velocity. Otherwise, the command velocity is zero.

The amount of the electrical current can be a measured amount ($I_{meas}$) or a command amount ($I_{cmd}$). A measured amount is the actual amount of electrical current that is supplied to the motor to hold the motor's position and can be measured by a current sensor. The command amount can be computed using a proportional integral derivative (PID) control loop to hold the motor's position, where the computed amount is a control variable of the PID control loop, and where the position error is used as the error that is minimized by the PID control loop.

The position error (e) can be the difference between a target position $\theta_T$ (or $\theta_{cmd}$) and a measured position ($\theta_{meas}$). The position error can be tracked over time and can be referred to as tracking error (e(t)).

In an example, the user device 110 switches to the back-drive mode 102 when the conditions are met. Otherwise, the user device 110 remains in the motor-drive mode 101. In particular, if the command velocity is zero (e.g., $V_{cmd}=0$), the amount of electrical current is larger than a threshold value (e.g., $I_{meas}$ or $I_{cmd}$>Current Threshold), and the position error is increasing over time (e.g., $e(t_2)>e(t_1)$ or $e(t_2)-e(t_1)$>Error Threshold), the back-drive mode 102 is enabled.

Referring back to the illustration of FIG. 1, while the external force 120 is applied, the command velocity is zero since there is no application request to rotate the display 112. The amount of the electrical current increases beyond a threshold value (e.g., becomes more than five-hundred milliamps). The initial position 151 $\theta_0$ is the target position OT. Due to the external force 120, the position has changed to the held position 152. The difference between the initial position 151 and the held position 152 is the position error 124 (illustrated in FIG. 1 as $\Delta\theta_1$). When this position error 124 increases over time (e.g., becomes larger than an error threshold value, such as half a degree), the user device 110 switches to the back-drive mode 102. Generally, a position difference between a target position and a measured position of a motor can correspond to a position error. The target position can be a position controlled and/or set by a motor controller. The measured position can be an actual position that is determined based on measurements performed by one or more position sensors. Position error and position difference may be used synonymously in the present disclosure.

While in the back-drive mode 102, the user device 110 can determine a trigger event to switch back to the motor-drive mode 101. Different trigger events are possible. In one example, a trigger event can relate to the application. For instance, upon detecting the wakeword and/or upon a communication session request associated with the application (e.g., initiation or receiving an audio and/or video call), the back-drive mode 102 is disabled and the motor-drive mode 101 is enabled. In another illustration, a trigger event can be time-based. For instance, automatically after a predefined time interval (e.g., thirty seconds) after the back-drive mode 102 is enabled or from the time the display 110 was rotated from the initial position 151, the back-drive mode 102 is disabled and the motor-drive mode 101 is enabled. Yet another trigger event can relate to the conditions. In particular, the user device 110 can continuously monitor the command velocity and the position error. If the command velocity changes to a non-zero value, the back-drive mode 102 is disabled and the motor-drive mode 101 is enabled. Similarly, if the position error remains constant, decreases, or becomes zero over time, the back-drive mode 102 is disabled and the motor-drive mode 101 is enabled.

Figure 2:
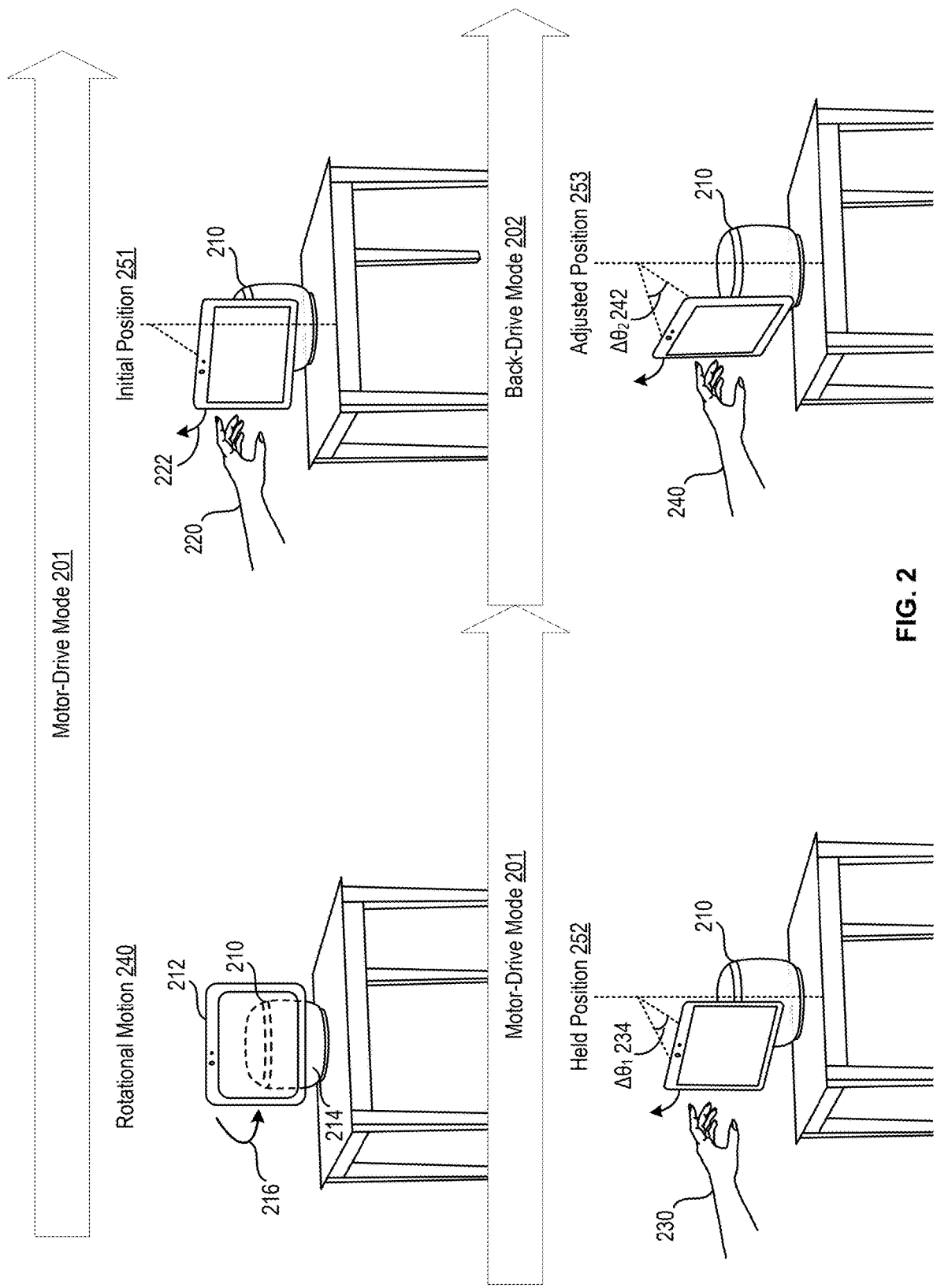
FIG. 2 illustrates another example of motions of a user device in a motor-drive mode and a back-drive mode, according to embodiments of the present disclosure.

FIG. 2 illustrates another example of motions of a user device 210 in a motor-drive mode 201 and a back-drive mode 202, according to embodiments of the present disclosure. Like the user device 110 of FIG. 1, the user device 210 may include a display 212 that can be rotated around a cylindrical body 214 of the user device 210. Rather that starting at a resting position as in FIG. 1, here initially, the user device 210 performs a rotational movement 240, whereby the display 212 is rotated in a direction 216. The rotational movement 240 is performed based on a request of an application and controlled, at least in part, by a flow of electrical current to a motor of the user device 210. Based on tracking conditions related to external forces applied to the display 212, the user device 210 may switch to operating in the back-drive mode 202. In particular, an initial external force 220 to rotate the display in an opposite direction 222 results in a stall, where the user device 210 increases the amount of electrical current to counter the external force 220. Thereafter, the same or additional external 230 force is applied resulting in a change to the position error. If the change is an increase, the user device 110 enables the back-drive mode 202. While in the back-drive mode 220, an external force 240 applied to the display 212 can rotate the display 212.

As illustrated, upon the application of the external force 220 to the user device 210, the user device 210 increases the amount of electrical current flowing to the motor to generate a resistive force. As a result, the display 212 is stalled and the velocity at which the motor rotates in the direction 216 becomes zero (or smaller than a velocity threshold value). The position at which the stall occurs can correspond to an initial position 251. At that point, a command velocity can be set to zero such that the motor holds its position as close as possible to the initial position 251.

The external force 230 can rotate the display 212 in the opposite direction, resulting in a held position 252 and a position error 234 (illustrated as ($\Delta\theta_1$)). The position error 234 can be the difference between the held position 252 and the initial position 251 and can be tracked over time. If the position error 234 increases (e.g., becomes larger than an error threshold value, such as half a degree), the user device 110 switches to the back-drive mode 202 because at this point in time all three conditions are met (e.g., $V_{cmd}=0$, $I_{meas}$ or $I_{cmd}$>Current Threshold, and (e.g., $e(t_2)>e(t_1)$ or $e(t_2)-e(t_1)$>Error Threshold).

While in the back-drive mode 202, additional or another external force 240 is applied to the display 212. In particular, the display 212 can be rotated in a direction 240 from the held position 252 to an adjusted position 253 (the difference between the held position 252 and the adjusted position 253 is illustrated as a position difference (402) 242). Subsequently, the user device 210 can detect any or a combination of an application-based trigger event, a time-based trigger event, or a condition-based trigger event to re-enable the motor-drive mode 201.

Figure 3:
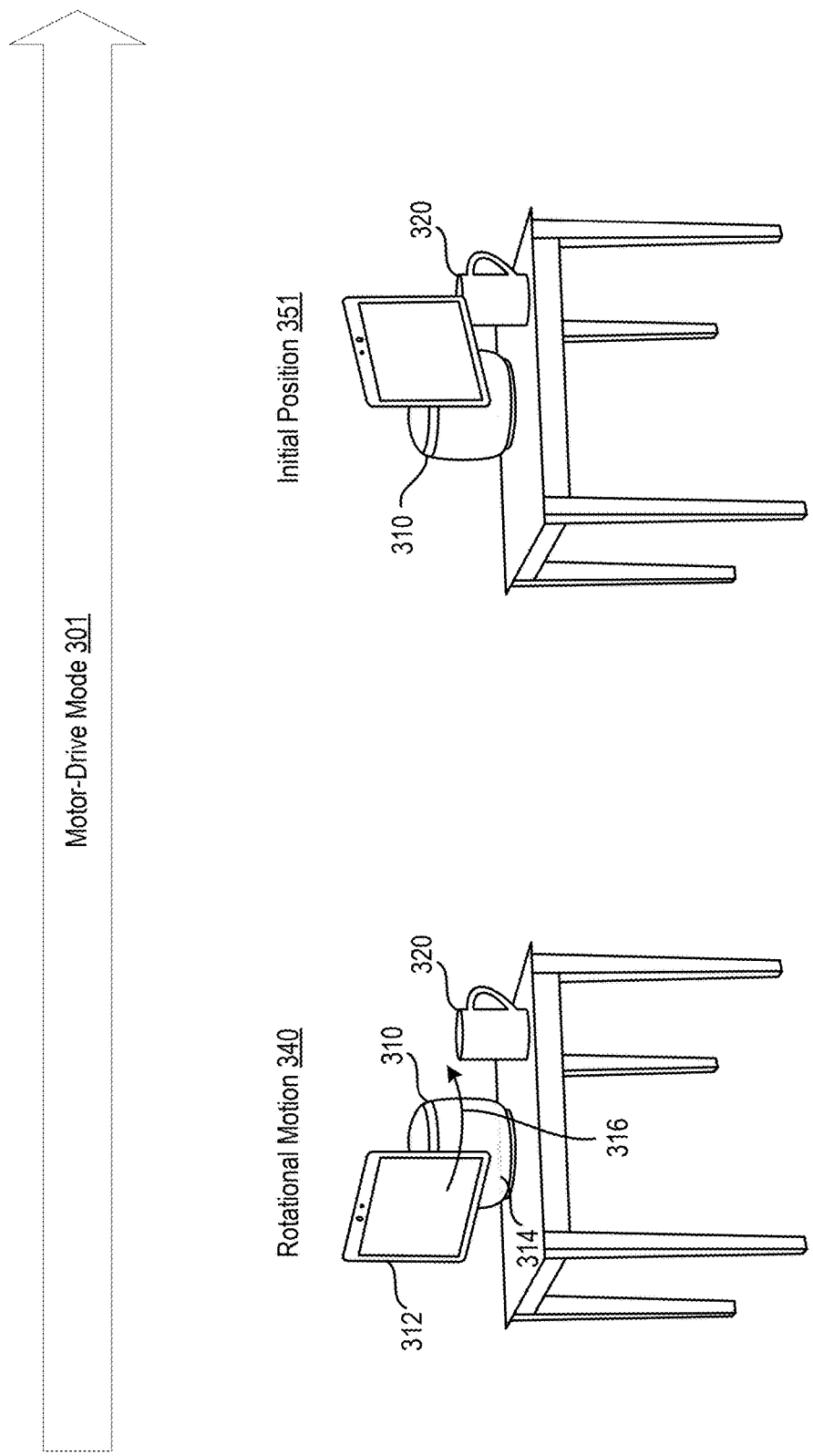
FIG. 3 illustrates another example of motions of a user device in a motor-drive mode, according to embodiments of the present disclosure.

FIG. 3 illustrates another example of motions of a user device 310 in a motor-drive mode 301, according to embodiments of the present disclosure. Like the user device 110 of FIG. 1, the user device 310 also supports a back-drive mode. Here, however, a stall or a proximity to an obstacle 320 is detected and the user device 310 remains in the motor-drive mode 301 rather than incorrectly switching to the back-drive mode.

As illustrated, based on a request of an application, the user device 310 performs a rotational movement 340, whereby a display 312 is rotated around a cylindrical body 314 of the user device 110 in a direction 316. As the display 312 comes in contact with (e.g., bumps against) or close to (e.g., within an acceptable position margin of error) the obstacle 320 (e.g., a wall, a surface, a water cup on a table, a book on a table, etc.), the user device 310 may stop the rotational movement 340 and remain in the motor-drive mode 301. The position at which the motor is stopped can become an initial position 351 from which another rotational movement (e.g., in the opposite direction) can start.

Referring back to the conditions, the velocity can become zero or smaller than a velocity threshold value. Before stopping the rotational movement 340, the amount of the electrical current can increase to exceed a current threshold value. However, the position error does not increase over time (e.g., remains constant). Accordingly, the user device 310 detects that at least one of the conditions (e.g., the position error) is not met and does not switch to the back-drive mode.

Figure 4:
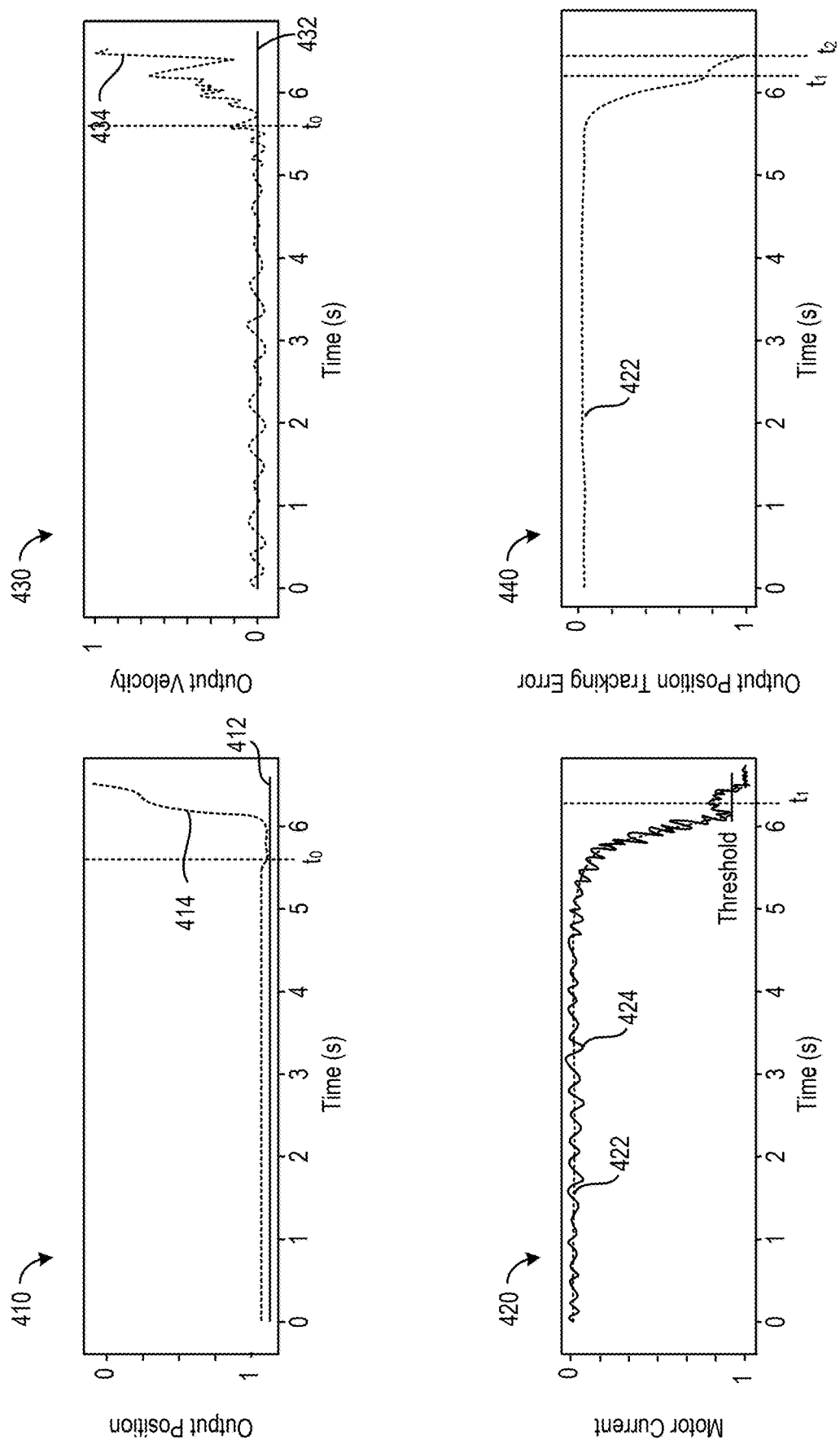
FIG. 4 illustrates an example of plots showing different conditions that can be tracked to determine a mode of operation of a user device, according to embodiments of the present disclosure.
Figure 5:
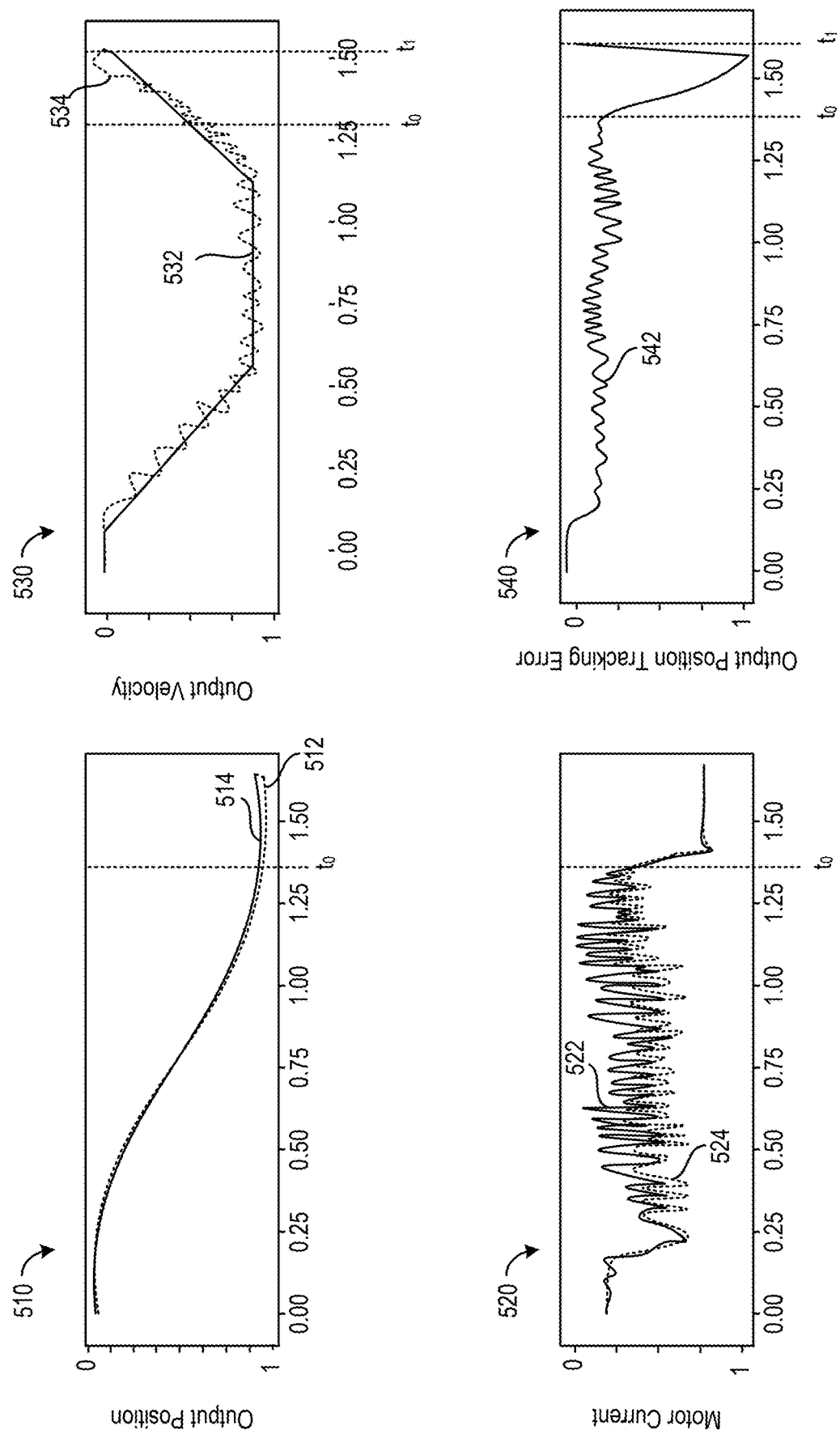
FIG. 5 illustrates another example of plots showing different conditions that can be tracked to determine a mode of operation of a user device, according to embodiments of the present disclosure.
Figure 6:
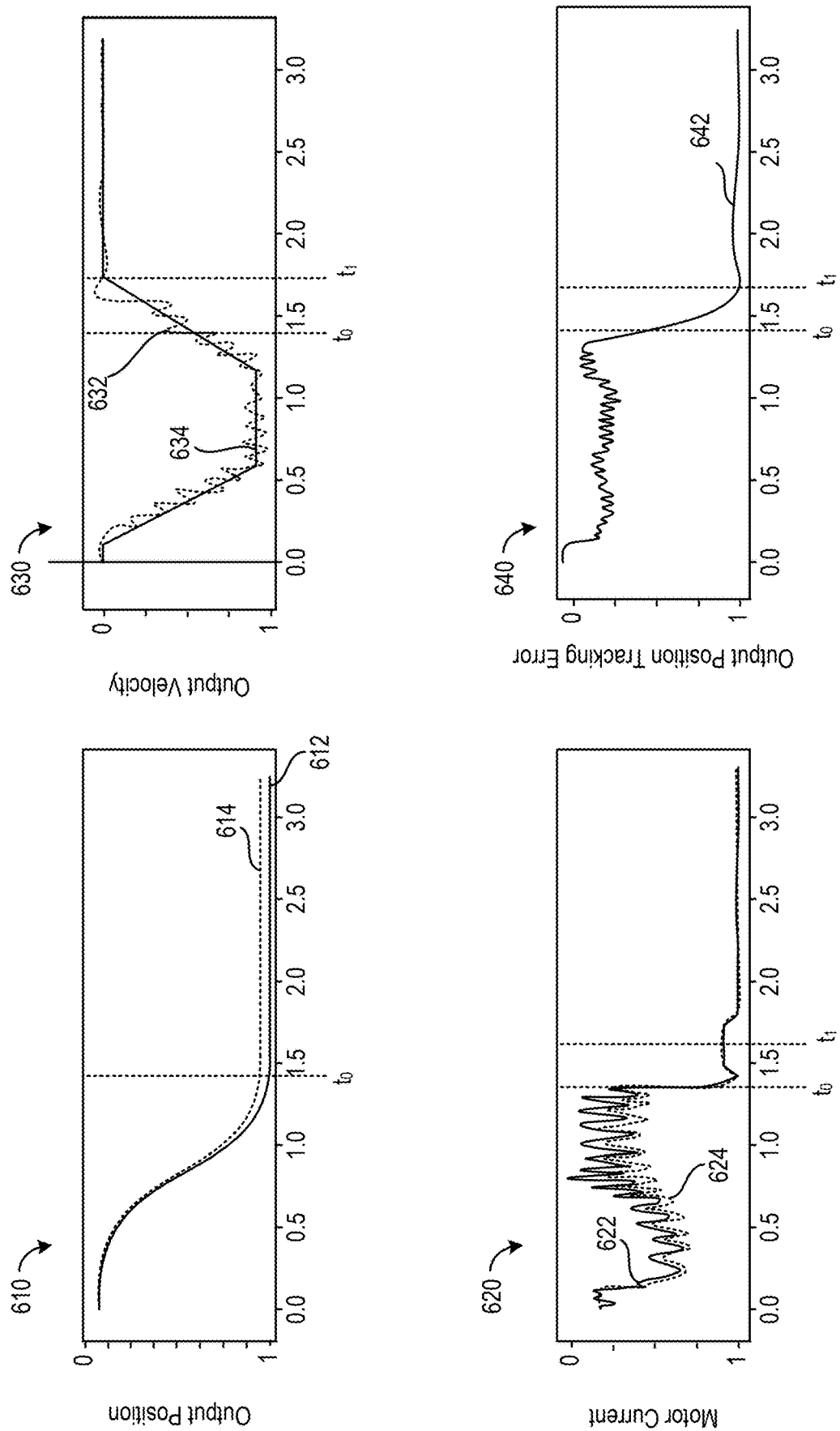
FIG. 6 illustrates another example of plots showing different conditions that can be tracked to determine a mode of operation of a user device, according to embodiments of the present disclosure.

In FIGS. 4-6, plots of different conditions are illustrated. The conditions relate to a command velocity (such as whether the command velocity is zero), an amount of electrical current (e.g., whether the amount is larger than a threshold), and a position error (whether the position error increases over time). When particular conditions are met (e.g., the command velocity is zero, the amount of the electrical current is larger than the threshold, and the position error is increasing), the back-drive mode of the motor is triggered. In the description, references are made to values (e.g., the value of the velocity, the value of the electrical current's amount, and the value of the position error). When compared to conditions (e.g., a zero velocity, a threshold, or increase), the references may refer to the absolute values (e.g., the absolute value of the velocity, the absolute value of the electrical current's amount, and the absolute value of the position error).

FIG. 4 illustrates an example of plots showing different conditions that can be tracked to determine a mode of operation of a user device, according to embodiments of the present disclosure. Values of the Y-axis are shown as normalized values between zero and one. A position plot 410 shows a position of a motor (or, equivalently, a load of the motor) as a function of time. Two types of position are plotted: a command position 412 and a measured position 414. The command position 412 corresponds to a position to which a motor is commanded to be moved (e.g., based on a request of an application). The measured position 414 is the actual position that the motor is in (e.g., based on data of a position sensor). As illustrated, the command position 412 and the measured position 414 are substantially the same up to time to, when the command position 412 and the measured position 414 start to diverge. In particular, the command position 412 remains substantially the same, whereas the measured position 414 increases. Accordingly, the plot 410 illustrates the situation similar to the one of FIG. 1, where, for instance, a display is not being rotated and remains at an initial position until time to, at which an external force is applied to move the display.

An electrical current plot 420 illustrates an electrical current associated with the motor as a function of time. Two types of electrical current are plotted: a command electrical current 422 and a measured electrical current 424. The command electrical current 422 can be computed as the electrical current needed to maintain the command position at the initial position (e.g., sixty degrees), where the computation can involve a PID control loop. The measured electrical current 424 is the actual current flowing to the motor (e.g., based on data from a current sensor). As illustrated, the command electrical current 422 and the measured electrical current 424 are substantially similar. Up to time $t_0$, the two electrical currents 422 and 424 are about zero milliamps. At time $t_0$, the two electrical currents 422 and 424 start increasing to provide a resistive force such that the motor can hold its position and remain as close as possible to the initial position. At time $t_1$, the amount of either the command electrical current 422 or the measured electrical current crosses a current threshold value.

A velocity plot 430 illustrates a velocity associated with the motor as a function of time. Two types of velocity are plotted: a command velocity 432 and a measured velocity 434. The command velocity 432 can be derived from the command position 412. The measured velocity 414 can be derived from the measured position 414. As illustrated, the command velocity 432 and the measured velocity 434 are substantially similar up to time to and diverge thereafter. In particular, up to time to, the command velocity 432 and the measured velocity 434 are about zero. After to, the command velocity 432 remains at substantially zero because no rotational movement is commanded. However, the measured velocity 434 increases because of the change to the measured position 414.

A position error plot 440 illustrates a position error 442 associated with the motor as a function of time (e.g., a tracking error). The position error 442 can be expressed as the difference between the command position 412 and the measured position 414. As illustrated, the position error 442 remains substantially constant up to time to and starts increasing thereafter. The time $t_1$, when the command electrical current 422 and the measured electrical current 424 exceed the current threshold value, can be used as an anchor time to define a time interval for analyzing the change to the position error 442. The time interval has a duration that can be predefined (e.g., 0.15 seconds). In the illustration of FIG. 4, a forward looking time interval is defined. In particular, the time interval starts at time $t_1$ and ends at time $t_2$ (e.g., $t_2=t_1+0.15$ seconds). During the time interval, the position error 442 continued to increase. Other types of time interval can be similarly used, such as a backward looking time interval (e.g., between time to and $t_1$ or between $t_3$ and $t_1$, where $t_3=t_1-01.5$ seconds), or a centered time interval (e.g., where $t_1$ is the center time point).

According to these plots, the measured electrical current 424 (or the command electrical current 422) at time $t_2$ is larger than the current threshold value, the command velocity 432 is substantially zero or smaller than a velocity threshold value (e.g., one degree per second), and the position error 442 increased during the time interval. The user device can determine that the conditions to switch to a back-drive mode are met and, thus, can enable this mode.

FIG. 5 illustrates another example of plots showing different conditions that can be tracked to determine a mode of operation of a user device, according to embodiments of the present disclosure. Similar to FIG. 4, a position plot 510, an electrical current plot 520, a velocity plot 530, and a position error plot 540 are illustrated. Values of the Y-axis are shown as normalized values between zero and one.

The position plot 510 shows a command position 512 and a measured position 514 As illustrated, the command position 512 and the measured position 514 are substantially the same up to time to, when the command position 512 and the measured position 514 start to diverge. In particular, prior to time to, the command position 512 and the measured position 514 illustrates that the motor's position changes from about zero to one (where these values are normalized values, as indicated above). After time to, the command position 512 continues to decrease, whereas the measured position 514 remains substantially at about one indicating that a contact with an obstacle and a stall.

The electrical current plot 520 illustrates a command electrical current 522 and a measured electrical current 524. At about time to, the two electrical currents 522 and 524 start increasing and thereafter cross a current threshold value and remain larger than that value.

The velocity plot 530 illustrates a command velocity 532 and a measured velocity 534. As illustrated, the command velocity 532 and the measured velocity 534 are substantially similar up to time to and diverge thereafter. In particular, up to time to, the two velocities 532 and 534 initially increase from zero to one, remain at the higher speed, and then start decreasing back to zero (where these values are normalized values, as indicated above). At time to, when the contact with the obstacle occurs, the measured velocity 534 becomes substantially zero, whereas the command velocity 532 continues its steady decrease to the zero-value and reaches it at time ti.

The position error plot 540 illustrates a position error 542 associated with the motor as a function of time (e.g., a tracking error). As illustrated, the position error 542 remains substantially constant up to time to and starts increasing thereafter. At time ti, when the command velocity 532 becomes substantially zero, the position at which the motor is can be set as the initial position because of the stall. Accordingly, the difference between the command initial position and the measured position 514 becomes substantially zero, resulting in also resetting the position error to about zero.

According to these plots, at time $t_1$, the measured electrical current 524 (or the command electrical current 522) is larger than the current threshold value, the command velocity 532 is substantially zero or smaller than a velocity threshold value (e.g., one degree per second), but the position error 542 is zero and does no longer increase. The user device can determine that the conditions to switch to a back-drive mode are not met and, thus, can remain in the motor-drive mode.

FIG. 6 illustrates another example of plots showing different conditions that can be tracked to determine a mode of operation of a user device, according to embodiments of the present disclosure. Similar to FIG. 5, a position plot 610, an electrical current plot 620, a velocity plot 630, and a position error plot 640 are illustrated. Values of the Y-axis are shown as normalized values between zero and one. Here, rather than being in contact with an obstacle, the rotational motion moves a load to be in proximity thereto, where the error margin is within an acceptable threshold.

The position plot 610 shows a command position 612 and a measured position 614. As illustrated, the command position 612 and the measured position 614 are substantially the same up to time to, when the command position 612 and the measured position 614 start to diverge. In particular, prior to time to, the command position 612 and the measured position 614 illustrates that the motor's position changes from zero, where this value is a normalized value as indicated above. After time to, the command position 612 continues to change to one and remains substantially at that value, whereas the measured position 614 remains substantially unchanged. The difference between the command position 612 and the measured position 614 is smaller than the acceptable error margin (e.g., ten degrees or some other predefined value).

The electrical current plot 620 illustrates a command electrical current 622 and the measured electrical current 624. At about time to, the command electrical current electrical current 622 and the measured electrical current 624 start increasing and thereafter cross a current threshold value and remain larger than that value.

The velocity plot 630 illustrates a command velocity 632 and a measured velocity 634. As illustrated, the command velocity 632 and the measured velocity 634 are substantially similar up to time $t_0$ and diverge thereafter. In particular, up to time $t_0$, the two velocities 632 and 634 initially increase from zero to about one, remain at the higher speed, and then start decreasing back to zero (where these values are normalized values, as indicated above). At time $t_0$, when the proximity to the obstacle occurs, the measured velocity becomes substantially zero, whereas the command velocity continues its steady decrease to the zero-value and reaches it at time $t_1$.

The position error plot 640 illustrates a position error 642 associated with the motor as a function of time (e.g., a tracking error). As illustrated, the position error 642 remains substantially constant up to time to and starts increasing thereafter. At time $t_1$, when the command velocity 632 becomes substantially zero, the position error 642 no longer increases and remains constant at about one (where this value is a normalized value, as indicated above).

According to these plots, at time $t_1$, the measured electrical current 624 (or the command electrical current 622) is larger than the current threshold value, the command velocity 632 is substantially zero or smaller than a velocity threshold value (e.g., one degree per second), but the position error 642 no longer increases. The user device can determine that the conditions to switch to a back-drive mode are not met and, thus, can remain in the motor-drive mode.

Referring back to FIGS. 5-6, if the position error was not considered and, instead, only the command velocity and the amount of electrical current were analyzed, the user device would have falsely switched to the back-drive mode. By also analyzing the position error, particularly its change over time (e.g., whether it increases or not during a time interval), the user device correctly remains in the motor-drive mode.

Figure 7:
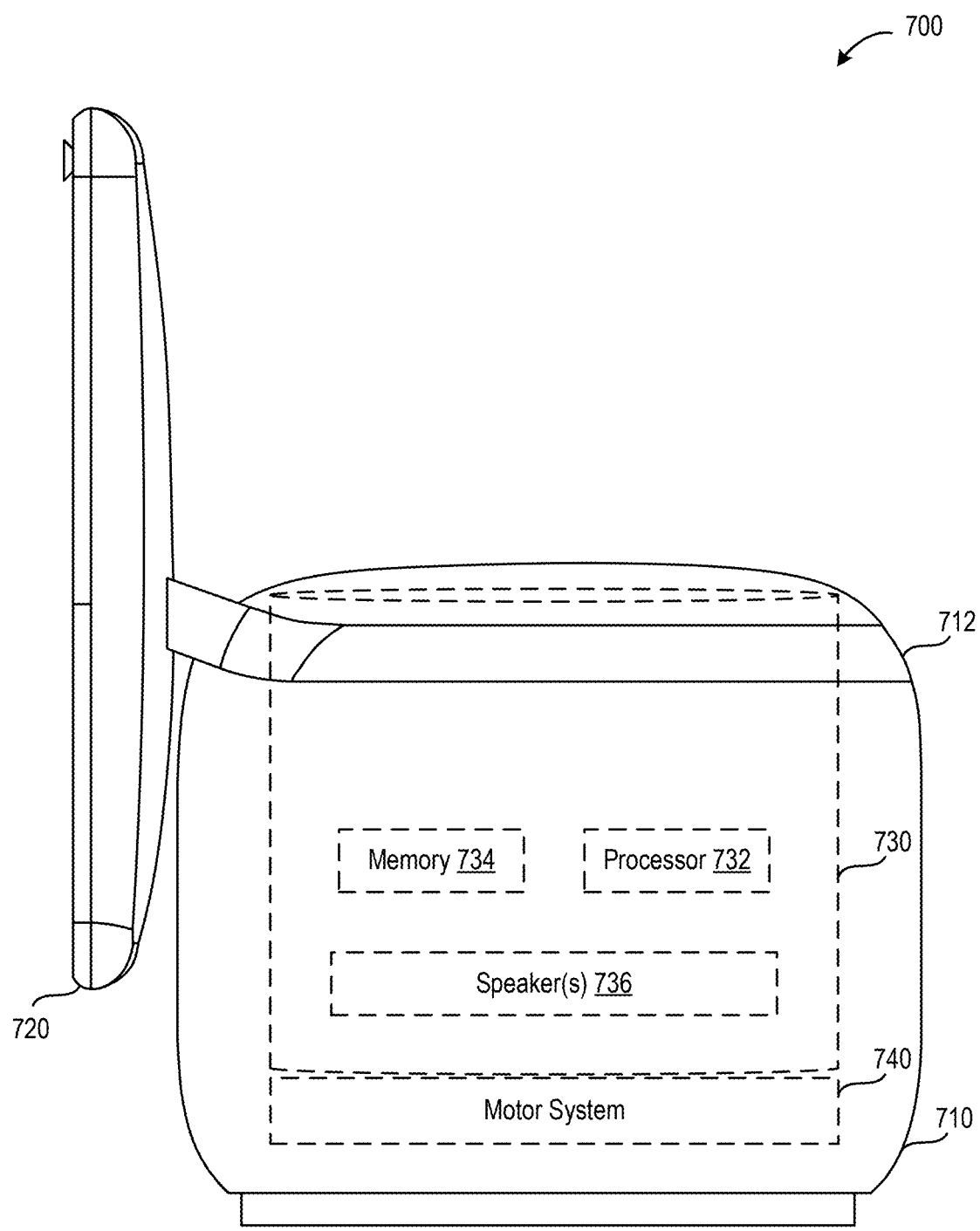
FIG. 7 illustrates an example of components of a user device that supports a motor-drive mode and a back-drive mode, according to embodiments of the present disclosure.

FIG. 7 illustrates an example of components of a user device 700 that supports a motor-drive mode and a back-drive mode, according to embodiments of the present disclosure. The user device 700 is an example of the user devices described herein above. As illustrated, the user device 700 includes a cylindrical body 710 and a display 720 that is rotatable around the cylindrical body.

In an example, the cylindrical body 710 is a housing that contains a circular ring 712, a data processing system 730 and a motor system 740. The housing can be made of a solid material, such as molded plastic, plastic structure with a fabric, metal structure with fabric, or a combination thereof. The motor system 740 is attached with the data processing system 730 that, in turn, is attached with the circular ring 712. In addition, the circular ring 712, made out of solid material, is attached with the display 720. In this way, the display 720 is mechanically coupled with the motor system 740 via the circular ring 712 and the data processing system 730. In a motor-drive mode, a rotation of the motor system 730 causes a rotation to the data processing system 730, in turn causing a rotation of the circular ring 712 and the display 720. In a back-drive mode, a rotation of the display 720 causes a rotation of the circular ring 712, in turn causing a rotation of the data processing system 730 and the motor system 740.

The data processing system 730 can include a housing, made out of a solid material and having an overall cylindrical shape, that contains a plurality of computing components such as a processor 732, a memory 734, a speaker(s) 736. The memory 734 stores computer-readable instructions of an application, where the computer-readable instructions are executable by the processor 732 to run the application. The speaker 736 may output audio based on audio data received from the processor 732. In an example, three speakers 736 are used, one arranged to emit sound towards a top of the housing, a second speaker and a third speaker oriented to radially emit sound away from the housing.

The motor system 740 can include a housing, made out of a solid material and having an overall cylindrical shape, that contains a plurality of computing components and motor components. An example of such components is further illustrated in FIG. 8 and include a motor, a motor controller, a power system, and sensing circuitry. In an example, the motor system 740 may include a brushless direct current motor having a rotating body and a stationary body. The rotating body may be mechanically coupled with the housing of the data processing system 730, such that when the motor is powered, this housing rotates with the rotating body. The stationary body may remain secure in place against the cylindrical body 710. The motor can be configured to rotate substantially by a certain degree range (e.g., three-hundred sixty degrees, three-hundred fifty-two degrees, one-hundred eighty degrees, or one-hundred seventy-two degrees) in both clockwise and counterclockwise directions.

The acceleration and speed of the motor can be controlled such that the motor does not rotate the display 720 at a high acceleration or a high speed that may damage the display 720 or an object when the display 720 is in motion and contacts the object. The acceleration and speed can be also controlled such that the motor rotates the display 720 at a large enough acceleration and/or a fast enough speed for a good device responsiveness and user experience. In an example, the motions that the motor system 740 can support can be performed according to zones of perception, defined by a field of view of a camera of the display 720. Within a first zone—the center of the field of view—the display 720 does not move if an object to which the display 720 is directed moves (e.g., a user that is being tracked via computer vision and/or audio detection). Within a second zone—the regions of the field of view outside the center—the display 720 can be rotated only if the object settles into a new position for long enough. And when the object enters a third zone—the edges of the field of view—the display 720 is rotated such that to remain in view. The range of these zones, their dependency on the distance from the display 720, and the speed and acceleration can be tuned. There can be also situations where the display 720 is not rotated, for instance, if a shutter of the camera is closed or if multiple candidate directions to orient the display 720 are possible and a determination of the proper direction is not feasible.

The display 720 can include a housing made out of a solid material and having an overall cuboid shape. The housing can contain a screen, a camera, a camera shutter, microphones, and other components. The screen may receive and output video data from the processor 732. The screen may also be a touchscreen that can receive user input, such as user taps and user gestures. Generally, the user input can apply a small force to the display 720. However, this small force does not trigger the motor system 740 to enable the back-drive mode because the various enabling conditions are not met (e.g., small force does not result in the command velocity being zero, the amount of electrical current of the motor being smaller a threshold value, and the position error increasing over time. Instead, the display 720 is retained in position in support of receiving the user input because the motor system 740 continues to operate in the motor-drive mode. The camera may generate and send image and/or video data to the processor 732. Such data may be processed by using, for instance, a computer vision algorithm to detect objects in the field of view of the camera and, as applicable, rotate the display 730 such that the field of view is centered at a target object. Similarly, the microphones may detect audio and send detected audio data to the processor 732. The microphones may be oriented in patterns and corresponding audio data received by the processor 732 may be used to determine a direction of speech input. For instance, beamforming, rime of arrival (ToA), or other techniques may be used to determine the direction.

In an example, the user device 700 is configured to track a user and they move throughout a space or relative to the user device 700. For example, as the user moves, the motor performs a rotational movement such that the display 720 and the speaker(s) 736 are oriented or centered on the user. Audio data generated by the microphones may be processed to determine the direction of the user, and correspondingly, such direction may be used to control the rotational movement. Additionally or alternatively, image data and/or video data from the camera may be processed to determine the direction of the user. As such, as the user moves, the display 720 and the housing of the data processing system 730 may rotate to present content on the display 720 and/or provide improved audio characteristics.

The user device 700 may be configured to support speech interaction with a user and respond to user requests. For instance, the user may verbally request the user device 700 to perform a task, such as to play music. The microphones capture audio associated with the user speech. In some examples, the user may indicate the request by prefacing the request with a wakeword, a keyword, and a trigger expression. The user device 700 may capture and, locally or jointly with a back end server, process the speech input to identify a command. Speech processing, such as automatic speech recognition (ASR), natural language understanding (NLU), and speech synthesis may be performed. Based on the command, the user device 700 may output a response, cause actions to be performed (e.g., play music), or elicit feedback. In the example of playing music, as the user moves around the space, the motor system 740 may rotate the housing of the computer system 730 such that the speaker(s) 736 are oriented in a manner that follows the user's movement.

Figure 8:
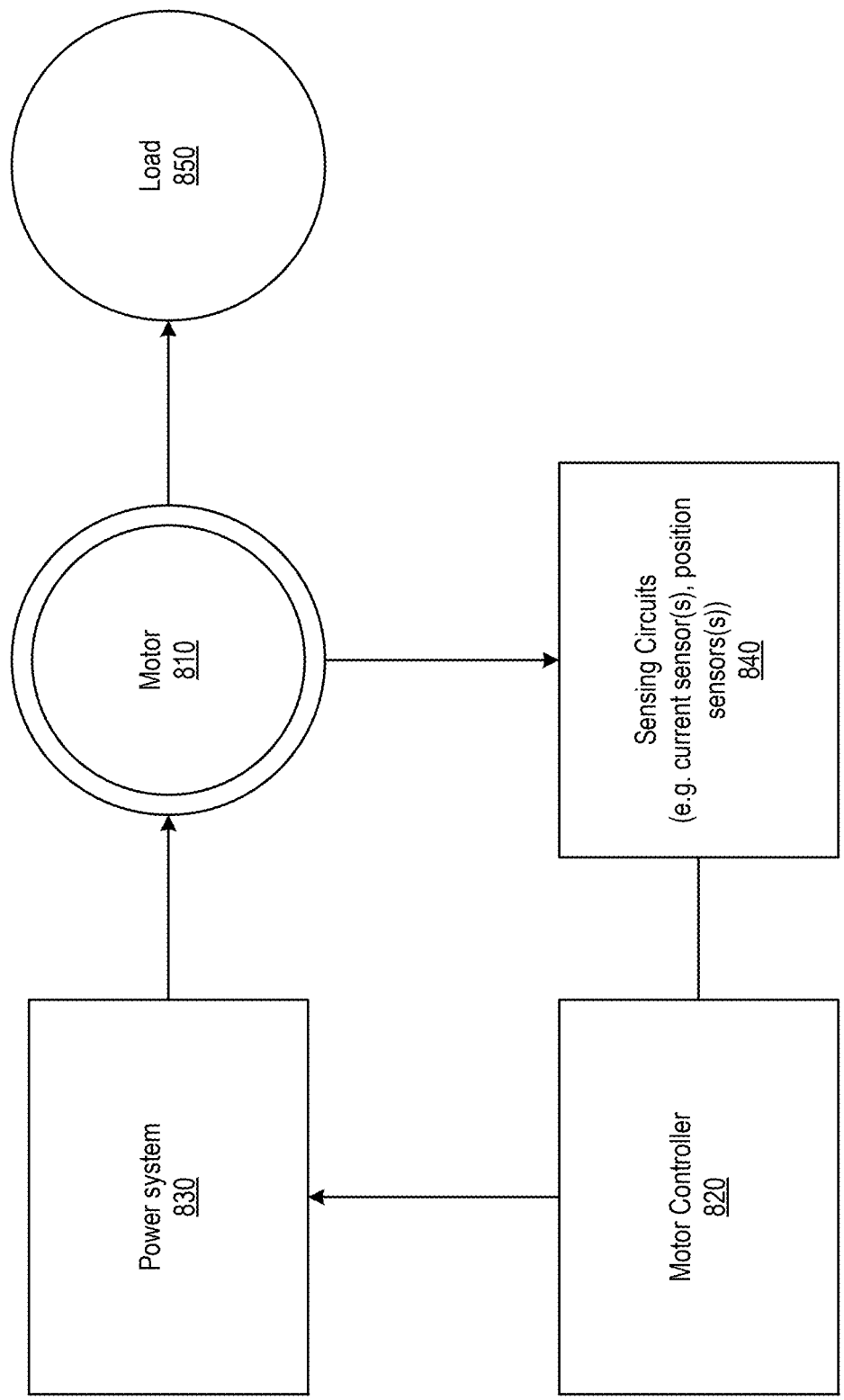
FIG. 8 illustrates an example of components of a motor system of a user device, according to embodiments of the present disclosure.

FIG. 8 illustrates an example of components of a motor system 800 of a user device, according to embodiments of the present disclosure. The motor system 800 is an example of the motor system 740 of FIG. 7. As illustrated, the motor system 800 includes a motor 810, a motor controller 820, a power system 830, and sensing circuitry 840. The motor 810 may be attached to a load 850 such as, for instance, the housing of the data processing system 730 of FIG. 7. In an example, the motor is a brushless DC motor that include a rotor and a stator. The rotor can be attached to the load 850, whereas the stator can remain stationary.

The motor controller 820 provides controls over operations of the motor, such as by controlling the supply of electrical energy from the power source 830 to the motor 810, such as by adjustably sending an amount of electrical current to the motor 810 (e.g., by controlling the flow of electrical current to the motor 810). In an example, the motor 850 can include a printed circuit board (PCB) having at least one of a processor, a memory, a digital signal processor (DSP), and a field-programmable gate array (FPGA), or a combination of such computing components. The power source 830 can be a direct current (DC) power source and may include converters (such as step-up converters and step-down converters) and switches (e.g., implemented as a set of switching transistors to support one-hundred twenty degrees conduction or one-hundred eighty degrees conduction) such that the electrical energy is controllably supplied using a pulse width modulation (PWM) technique. The sensing circuitry 840 is employed to detect rotor position, rotor speed, motor current, or motor terminal voltages. In an example, the sensing circuitry 840 is used in a PID control loop.

In an example, the sensing circuitry 840 includes one or more position sensors, such as Hall effect sensors and/or optical sensors, and one or more current sensors. Magnet pole and rotor position can be detected by a Hall effect sensor. The speed and rotor position can be calculated and precisely controlled, accordingly. An optical sensor can measure an angular displacement or position of the motor relative to a stationary portions of the user device or the motor 810. An optical index, for example, may mount to the stationary portion and the optical sensor may mount to the rotor. As the motor 810 rotates, the optical sensor may image the optical index to determine the position. A current sensor can be a low-side current sensor, a high-side current sensor, or an in-line phase current sensor.

FIGS. 9-12 illustrate example flows for controlling a motor of a user device. Operations of the flows can be performed by a user device, such as the user device 700. Some or all of the instructions for performing the operations can be implemented as hardware circuitry and/or stored as computer-readable instructions on a non-transitory computer-readable medium of the sound detector. As implemented, the instructions represent modules that include circuitry or code executable by processor(s) of the user device. The execution of such instructions configures the user device to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

Figure 9:
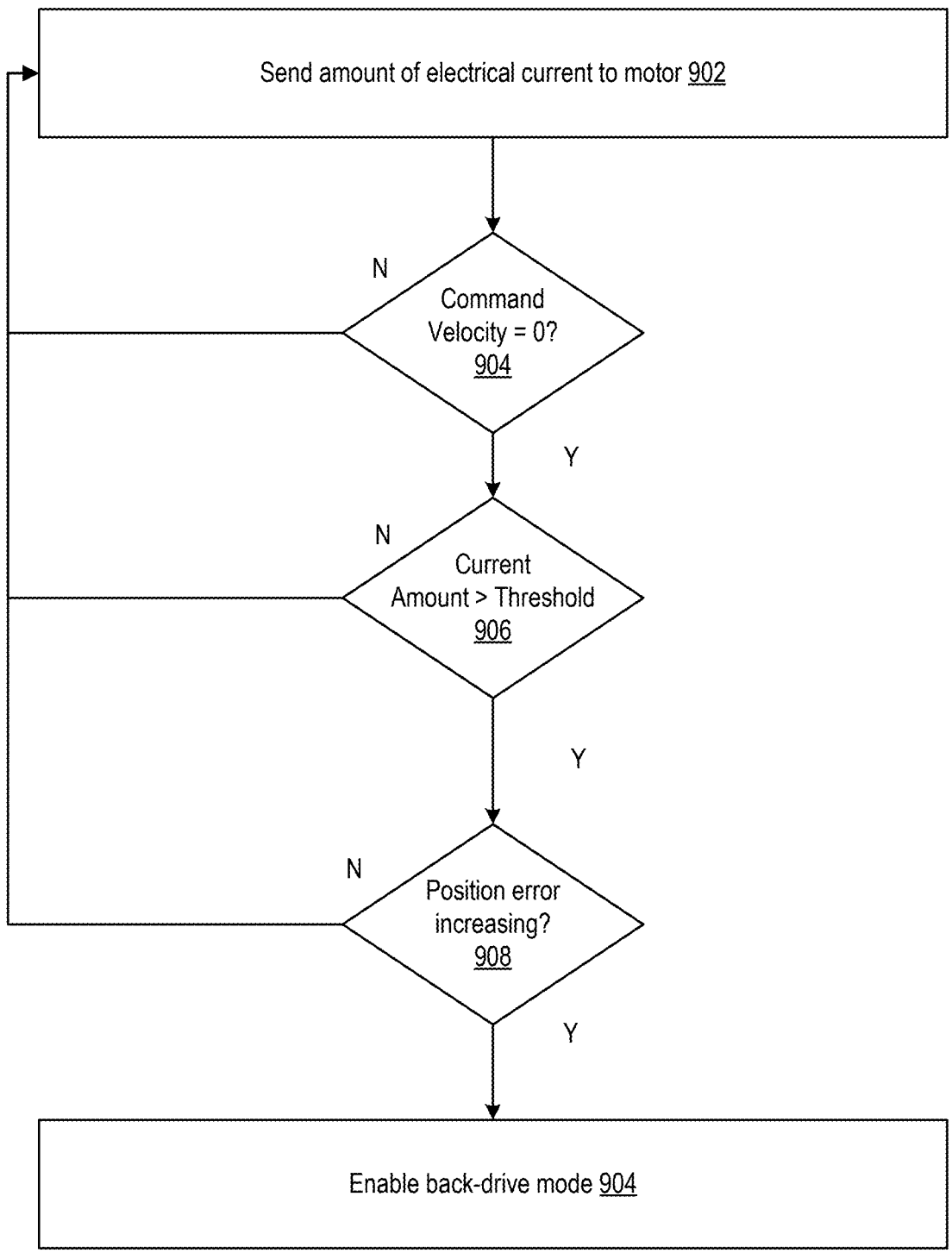
FIG. 9 illustrates an example flow for determining that a motor of a user device may operate in back-drive mode, according to embodiments of the present disclosure.

FIG. 9 illustrates an example flow for determining that the motor of the user device may operate in back-drive mode, according to embodiments of the present disclosure. In an example, the flow may start at operation 902, where the user device may send an amount of electrical current to the motor. In an example, sending the amount can include controlling a flow of electrical current to the motor, where the control can rely on a control loop. For instance, a display of the user device may not be in motion, while the user device is in a motor-drive mode. The position of the motor is an initial position. However, an external force is applied to the display to rotate in a direction. A motor controller may control the amount of electrical current to the motor such that a resistive force is generated in an attempt to maintain, for a predefined time interval (e.g., 0.15 seconds) the display, or equivalently, the motor as close to the initial position as possible. The motor controller can compute a command electrical current based on a PID control loop and may control a power system such that the amount of the electrical current is substantially the same as the command electrical current. In particular, a measured position of the motor is determined based on data from a position sensor(s). The PID control loop uses the command electrical current as a control variable and the motor controller sets the command electrical current to minimize or eliminate the difference between the initial position and the measured position. In another illustration, the motor may already be rotating in the opposite direction prior to the application of the external force. The motor controller can control the rotation of the motor between different target positions of the motor (e.g., first position at a first time, second position at a second time, etc. where a difference between the first position and the second position corresponds to a commanded rotation of the motor). Here also, the measured position is also determined over time and compared to the target positions (for instance, at the second time for comparison with the second position). The motor controller sets the command electrical current to minimize or eliminate the difference between each target position and the corresponding measured position (e.g., the difference between the second position and the measured position at the second time).

At operation 904, the user device determines whether a command velocity associated with the motor is equal to, is to be set to zero, or is less than a velocity threshold value (e.g., small enough). In an example, an application may be executed on the user device. For instance, a processor of the user device may execute computer-readable instructions of the application, where such instructions are stored in a memory of the user device. The application may not request a rotational motion of the motor. In this case, the motor controller may receive data from the processor indicating that the rotational motion is not requested. Accordingly, the command velocity is determined to be zero. In another example, the rotational motion may be ongoing. However, upon a stall occurring or when the display is in proximity to the final target position within an acceptable error margin, the command velocity can be set to zero. In both examples, if the velocity condition is met, operation 906 may follow operation 904. Otherwise, the flow loops back to operation 902, whereby the user device remains in the motor-drive mode.

At operation 906, the user device determines whether an amount of the electrical current flowing to the motor exceeds a current threshold value. In an example, the amount is measured by a current sensor and the motor controller may receive data from the current sensor indicating the amount. In another example, the electrical current is a command electrical current and the motor controller computes the amount based on the PID control loop, where the command electrical current is a control variable of this loop. The current threshold value may be predefined and stored in a memory of the motor controller (e.g., five-hundred milliamps, five-hundred and thirty milliamps, or some other value). If the amount exceeds the current threshold value, operation 908 follows operation 906. Otherwise, the flow loops back to operation 902, whereby the user device remains in the motor-drive mode.

At operation 908, the user device determines whether a position error of the motor is increasing. In an example, the position error is the difference between the measured position and the target position at which the motor is to be held (e.g., the initial position). As explained herein above, the motor controller receives data from the position sensor at different times. At each time, the data indicates a measured position of the motor at the corresponding time. The target position may be fixed to the initial position. Over time, the difference between the measured position and the target position is determined and corresponds to a tracking error. If during the predefined time interval (e.g., 0.15 seconds), the position error (e.g., the tracking error) increases, the motor controller determines that this condition is met and operation 910 follows operation 908. Otherwise, the flow loops back to operation 902, whereby the user device remains in the motor-drive mode.

At operation 910, the user device enables the back-drive mode. For example, the motor controller stops the sending of the amount of the electrical current to the motor. For instance, the motor controller reduces the amount of electrical current sent to zero, thereby or to be less than a predefined amount stopping the flow of the electrical current to the motor, or reducing the amount can include (e.g., to provide a dampening force if dampening is desired during the back-drive mode).

Although FIG. 9 illustrates the transition between two modes, embodiments of the present disclosure are not limited as such. For instance, a motor system can support one or more other operational modes, in addition to the back-drive mode and motor-drive mode. In this illustration, upon the conditions being met (e.g., command velocity equals zero, amount of current exceeding threshold value, and position error increasing), the motor system can disable a current operational mode (whether motor-drive mode or otherwise) and enable the back-drive mode. As further described in the next figures, upon a trigger event to exit the back-drive mode, the motor system can disable the back-drive mode and enable the same or a different operational mode.

Figure 10:
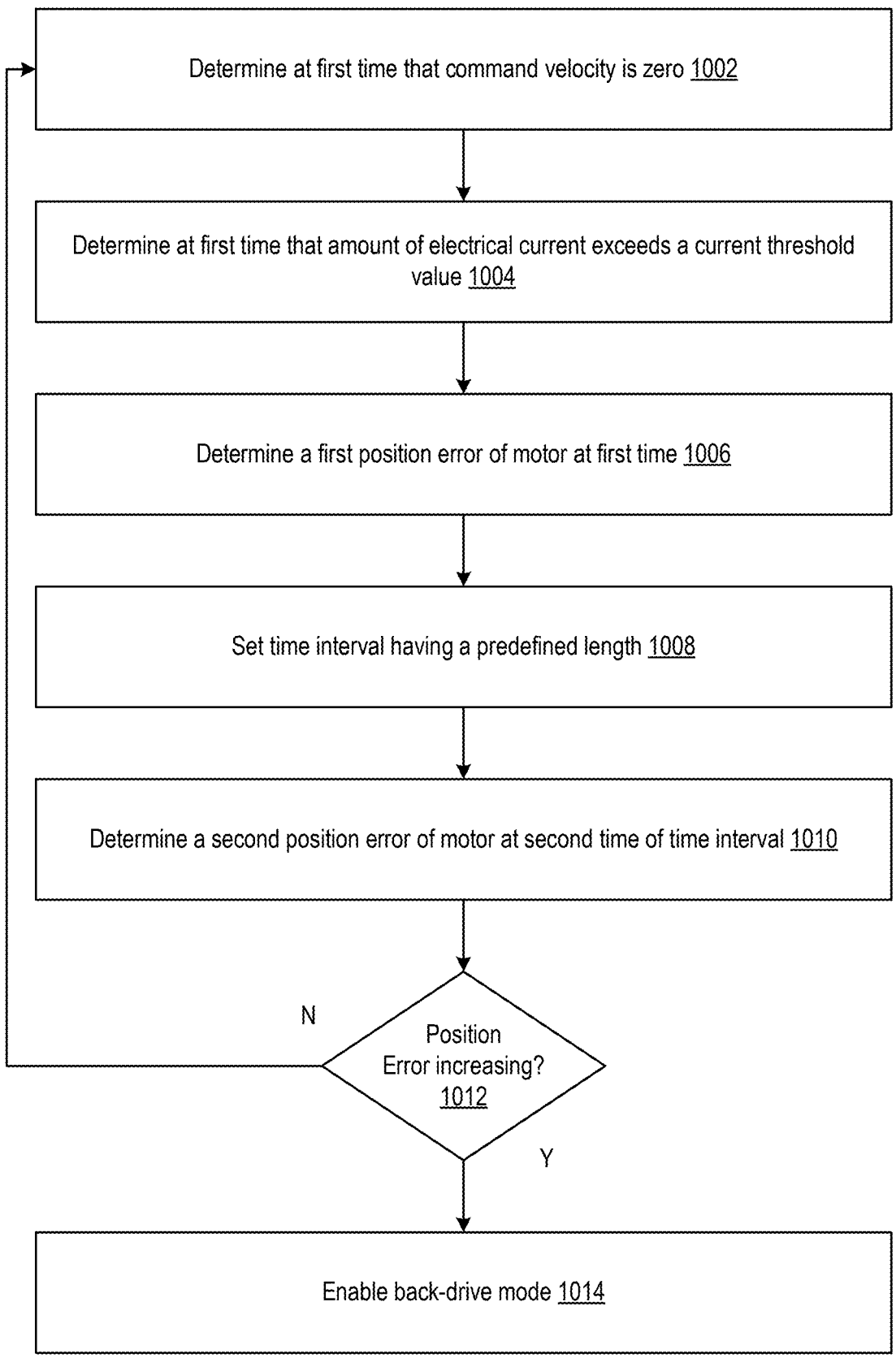
FIG. 10 illustrates an example flow for determining a change to a position error that that may trigger a motor of a user device to operate in back-drive mode, according to embodiments of the present disclosure.

FIG. 10 illustrates an example flow for determining a change to a position error that may trigger the motor of the user device to operate in back-drive mode, according to embodiments of the present disclosure. In an example, the flow may start at operation 1002, where the motor controller determines that a command velocity is zero at a first time. At operation 1004, the motor controller determines that an amount of electrical current (e.g., a measured electrical current) flowing to the motor exceeds the current threshold value at the first time.

At operation 1006, the motor controller may determine a first position error of the motor at the first time. For example, a first position is a measured position determined from data received from the position sensor at the first time. The difference between the first position and a target position is the first position error.

At operation 1008, the motor controller sets a time interval having a predefined length. For instance, the predefined length is 0.15 seconds, or some other default value, and is stored in the memory of the motor controller. The time interval can be forward looking, where the first time is the start of the time interval and a second time is an end of the time interval. The time interval can be backward looking, where the first time is the end of the time interval and the second time is the start of the time interval. Or the time interval can be centered around the first time, starting at the second time, and ending at a third time.

At operation 1010, the motor controller determines a second position error at the second time. For example, a second position is a measured position determined from data received from the position sensor at the second time. The difference between the second position and the target position is the second position error.

At operation 1012, the motor controller determines whether the position error is increasing. For instance, the motor controller determines a difference between the second position error and the first position error. The difference corresponds to a change to the position error. If the difference is positive, the position error is increasing. If the difference is negative or substantially zero, the position error is not increasing (e.g., is decreasing, remains constant, or is zero). If increasing, operation 1014 follows operation 1012. Otherwise, the flow loops back to operation 1002, whereby the user device remains in the motor-drive mode. In a further example, the change (when positive) is compared to a degree threshold value (e.g., to 0.5 degrees or some other value) stored in the memory of the motor controller. If larger than the degree threshold value, operation 1014 follows operation 1012. Otherwise, the flow loops back to operation 1002, whereby the user device remains in the motor-drive mode.

At operation 1014, the motor controller enables the back-drive mode. For example, the motor controller stops the flow of the electrical current to the motor.

Figure 11:
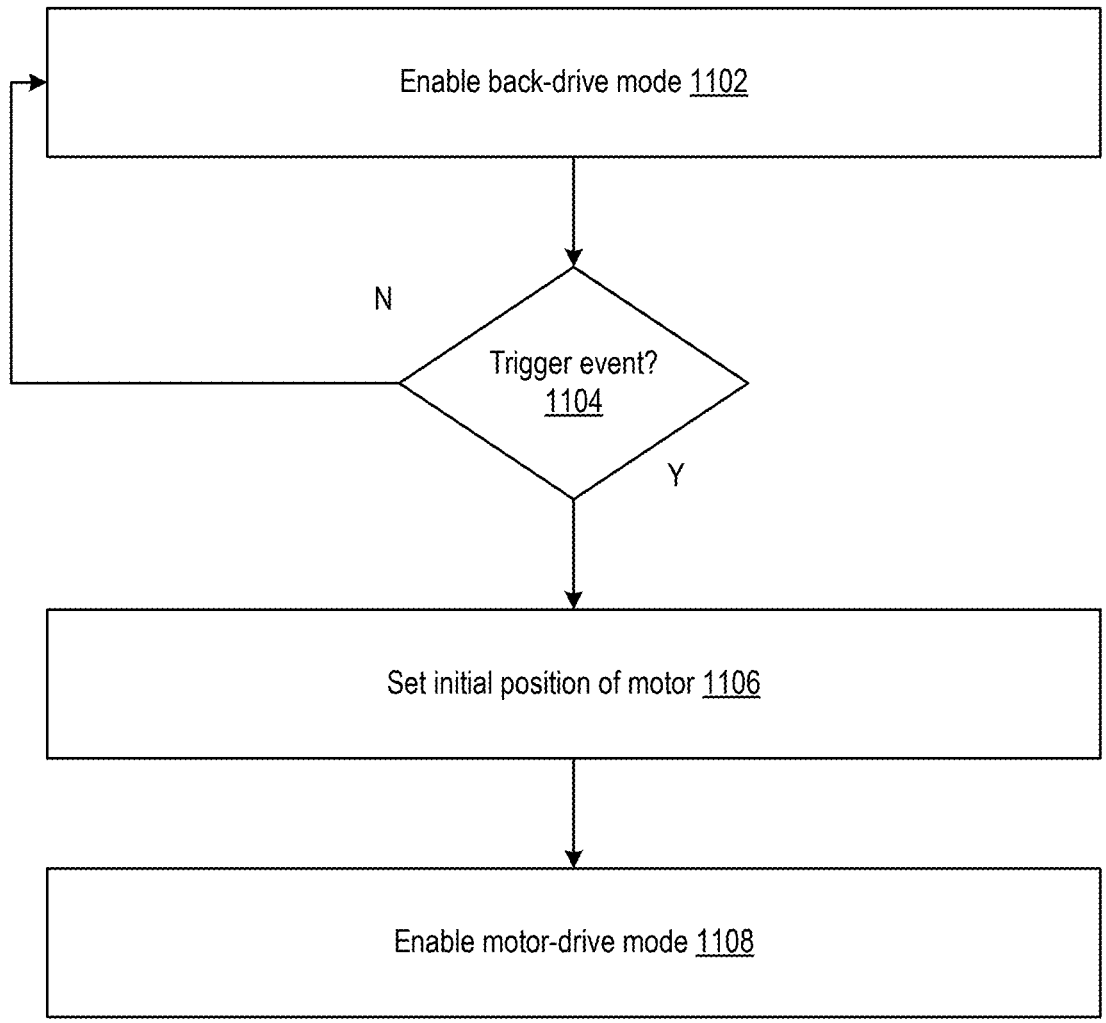
FIG. 11 illustrates an example flow for determining that a motor of a user device may operate in a motor-drive mode, according to embodiments of the present disclosure.

FIG. 11 illustrates an example flow for determining that the motor of the user device may operate in the motor-drive mode, according to embodiments of the present disclosure. In an example, the flow may start at operation 1102, where the user device enables the back-drive mode. For example, the motor controller stops the flow of the electrical current to the motor.

At operation 1104, the user device may determine whether a trigger event is detected. In an example, the trigger event indicates that the motor-drive mode is to be used. If so, operation 1106 follows operation 1104. Otherwise, the flow loops back to operation 1102, whereby the user device remains in the back-drive mode. Different trigger events are possible. In one example, a trigger event can relate to the application. For instance, upon detecting the wakeword and/or upon a communication session request associated with the application (e.g., initiation or receiving an audio and/or video call), data is sent by the processor to the motor controller indicating a request for a rotational motion (e.g., command velocity is no longer zero). This request can also indicate an end target position that corresponds to a direction from which the audio originates. In another illustration, a trigger event can be time-based. For instance, after a predefined time interval (e.g., thirty seconds) after the back-drive mode is enabled, the back-drive mode is to be automatically disabled and the motor-drive mode is enabled. In this case, the expiration of the predefined interval results in the trigger events. Yet another trigger event can relate to the conditions, such as to the command velocity and change to the position error, as further described in the flow of FIG. 12.

At operation 1106, the user device has determined that the motor-drive mode is to be enabled. Accordingly, the user device sets an initial position of the motor. In an example, the motor controller receives data from the position sensor at the time the trigger event is detected and indicating a measured position. The motor controller sets the measured position as the initial position.

At operation 1108, the user device enables the motor-drive mode. For example, the motor controller starts controlling a flow of electrical current to the motor based on the PID control loop.

Figure 12:
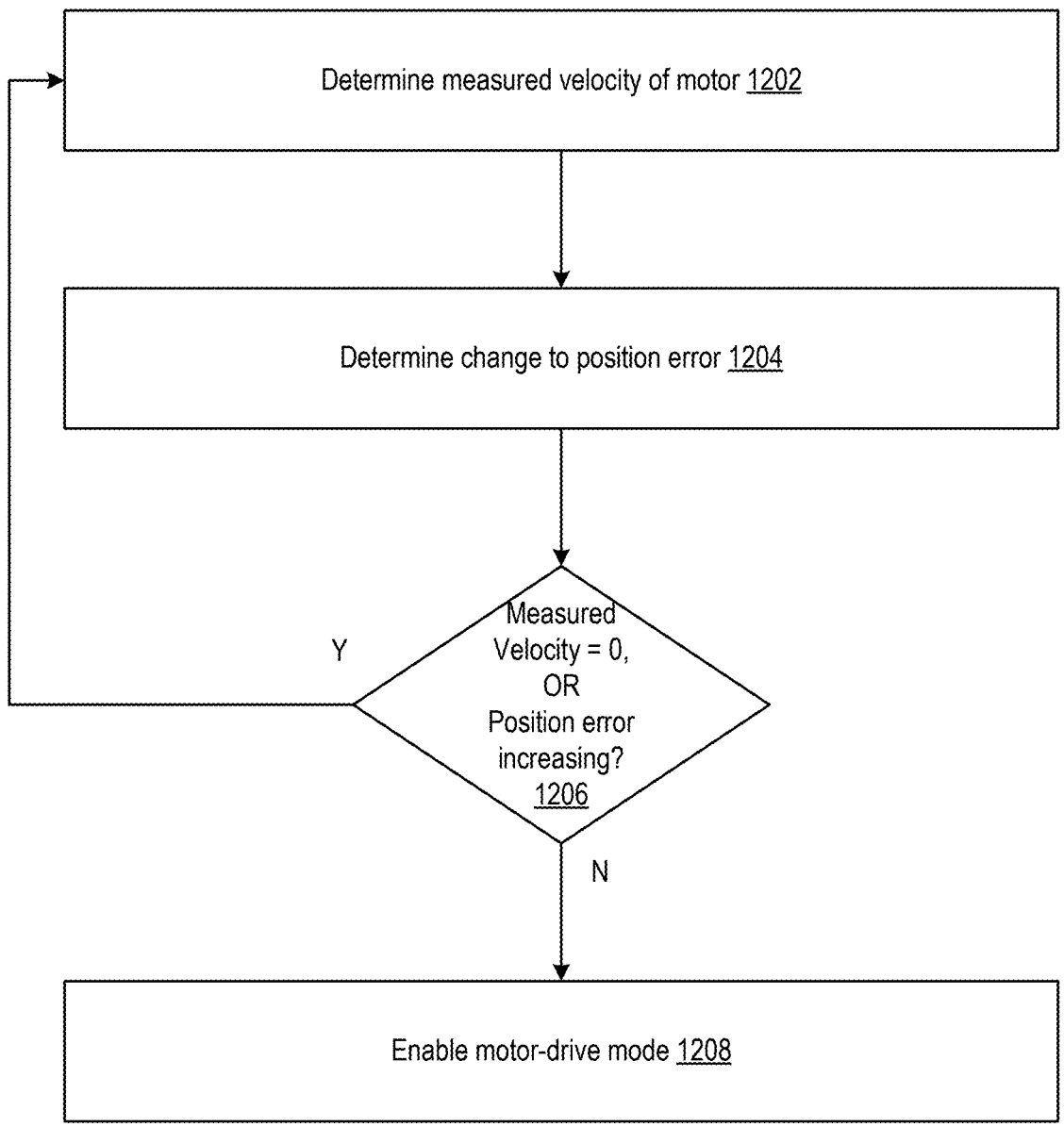
FIG. 12 illustrates an example flow for determining velocity and position error conditions that may trigger a motor of a user device to operate in a motor-drive mode, according to embodiments of the present disclosure.

FIG. 12 illustrates an example flow for determining velocity and position error conditions that may trigger the motor of the user device to operate in the motor-drive mode, according to embodiments of the present disclosure. The user device is in the back-drive mode. In an example, the flow may start at operation 1202, where the motor controller determines a measured velocity of the motor. For instance, one or more position sensors are used to determine a position of the motor and that position is tracked over time to determine the measured velocity.

At operation 1204, the motor controller determines a change to the position error. As explained herein above in connection with operations 1010 and 1012 of FIG. 10, the motor controller tracks the position error over time (e.g., a tracking error). In an example, the motor controller sets a second time interval that starts at the end of the time interval described in FIG. 10, determines the position errors at the start and at the end of this second time interval, and the difference between these two positions errors is the tracked error during the second time interval. This monitoring of the position error can be repeated across multiple time intervals.

At operation 1206, the motor controller determines whether the measured velocity is zero or is within a small velocity threshold value close to zero, or whether the position error is increasing. If any of these two conditions are not met, operation 1208 follows operation 1206. Otherwise, the flow loops back to operation 1202, whereby the user device remains in the back-drive mode.

At operation 1208, the motor controller enables the motor-drive mode. For example, the motor controller starts controlling a flow of electrical current to the motor based on the PID control loop. Although not illustrated in FIG. 12, the flow can also include setting an initial position of the motor before, upon, or after enabling the motor-drive mode.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A device comprising:
   a motor; and
   a motor controller configured to:
   cause an amount of electrical current to be sent to the motor such that the motor moves to or remains at a first position;
   determine a second position of the motor;
   determine a position difference between the first position and the second position;
   monitor the position difference over a time interval;
   determine that a velocity of the motor is set to be smaller than a first threshold value;
   determine that the amount of electrical current is larger than a second threshold value; and
   cause a reduction to the amount of electrical current based at least in part on the monitoring, the velocity being smaller than the first threshold value, and the amount of electrical current being larger than the second threshold value.

2. The device of claim 1, wherein the first position is a target position, the second position is a measured position, the position difference is a position error, and the motor controller is further configured to:

determine an increase to the position error during the time interval, wherein the reduction to the amount of electrical current is further based at least in part on the increase to the position error.

3. The device of claim 1, wherein the amount of electrical current remains the same or changes during the time interval absent of a control of the motor controller.

4. The device of claim 1, wherein the amount of electrical current is sent to the motor while the device is operated in a first operational mode, wherein the device is operated in a second operational mode after the amount of electrical current is reduced, and wherein the motor controller is further configured to:

determine, while the device is operated in the second operational mode, a trigger event associated with operating the device in the first operational mode; and cause, based at least in part on the trigger event, the device to operate in the first operational mode by at least causing a second amount of electrical current to be sent to the motor.

5. The device of claim 4, wherein the motor controller is further configured to:

determine a third position of the motor prior to causing the device to operate in the first operational mode; and set an initial position of the motor in the first operational mode to the third position.

6. The device of claim 4, further comprising:

a set of microphones configured to generate audio data corresponding to detected audio; and a processor configured to:

determine, based at least in part on the audio data, a direction of the detected audio, and send, to the motor controller based at least in part on the direction, request data indicating a request for a rotational motion, wherein the trigger event is determined based at least in part on the request data.

7. The device of claim 4, wherein the motor controller is further configured to:

determine a length of time since a start of the device operating in the second operational mode; and determine that the length of time is greater than a threshold value, wherein the trigger event is determined based at least in part on the length of time being greater than the threshold value.

8. The device of claim 4, wherein the motor controller is further configured to:

determine a velocity of the motor during a second time interval while the device is operating in the second operational mode; and determine that the velocity is smaller than a threshold value, wherein the trigger event is determined based at least in part on the velocity being smaller than the threshold value.

9. The device of claim 4, wherein the motor controller is further configured to:

determine a third position of the motor during a during a second time interval while the device is operating in the second operational mode;

determine a fourth position of the motor during the second time interval;

determine a second position difference between the third position and the fourth position; and determine that the second position difference is smaller than a threshold value, wherein the trigger event is determined based at least in part on the second position difference being smaller than the threshold value.

10. A method comprising:

sending an amount of electrical current to a motor of a device to cause the motor to move to a first target position at a first time during a time interval;

determining a first measured position of the motor at the first time;

determining, at a second time during the time interval, a second target position of the motor and a second measured position of the motor;

determining an increase to a position difference between the first target position and the second target position based at least in part on a first difference between the first target position and the first measured position and a second difference between the second target position and the second measured position; and reducing the amount of electrical current based at least in part on the increase to the position difference.

11. The method of claim 10, further comprising:

determining, based at least in part on an execution of an application on the device, that a velocity of the motor is set to or to be set to zero, wherein reducing the amount of electrical current is further based at least in part on the velocity.

12. The method of claim 10, further comprising:

monitoring the position difference over a time interval, wherein the amount of electrical current is reduced further based at least in part on the monitoring.

13. The method of claim 10, further comprising:

determining the increase to the position difference during the time interval.

14. The method of claim 10, further comprising:

causing an increase to the amount of electrical current during the time interval; and determining that an additional change to the position difference during the time interval is smaller than a threshold value despite the increase to the amount of electrical current, wherein reducing the amount of electrical current is further based at least in part on the additional change.

15. The method of claim 10, further comprising:

causing an increase to the amount of current during the time interval; and determining that the increase to the amount of current is larger than a threshold value.

16. A motor controller comprising:

one or more processors; and one or more memory storing instructions that, upon execution by the one or more processors, configure the motor controller to:

cause an amount of electrical current to be sent to a motor such that the motor moves to or remains at a first position;

determine a second position of the motor;

determine a position difference between the first position and the second position;

monitor the position difference over a time interval;

cause a reduction to the amount of electrical current based at least in part on the monitoring;

determine, after the reduction to the amount of electrical current, that a measured position of the motor remains constant during a subsequent time interval; and cause an increase to the amount of electrical current based at least in part on the measured position remaining constant.

17. The motor controller of claim 16, wherein the one or more memory store further instructions that, upon execution by the one or more processors, configure the motor controller to:

determine, after the reduction to the amount of electrical current, a trigger event associated with increasing the amount of electrical current;

determine a current position of the motor at a time associated with the trigger event;

cause an increase to the amount of electrical current; and set an initial position of the motor to the current position upon the increase to the amount of electrical current.

18. The motor controller of claim 16, wherein the one or more memory store further instructions that, upon execution by the one or more processors, configure the motor controller to:

determine a first increase to the position difference during the time interval, wherein the reduction to the amount of electrical current is further based at least in part on the first increase;

determine that the position difference remained constant or decreased during a subsequent time interval; and cause a second increase to the amount of electrical current based at least in part on the position difference remaining constant or decreasing.

19. The motor controller of claim 16, wherein the reduction is caused based at least in part on the monitoring indicating an increase to the position difference.

20. The motor controller of claim 16, wherein the one or more memory store further instructions that, upon execution by the one or more processors, configure the motor controller to:

monitor a change to the position difference during the time interval.

* * * * *